Oct. 18, 1949.　　　　F. SEBURGER　　　　2,485,216
MIXER
Filed Jan. 17, 1948　　　　　　　　　　　2 Sheets-Sheet 1
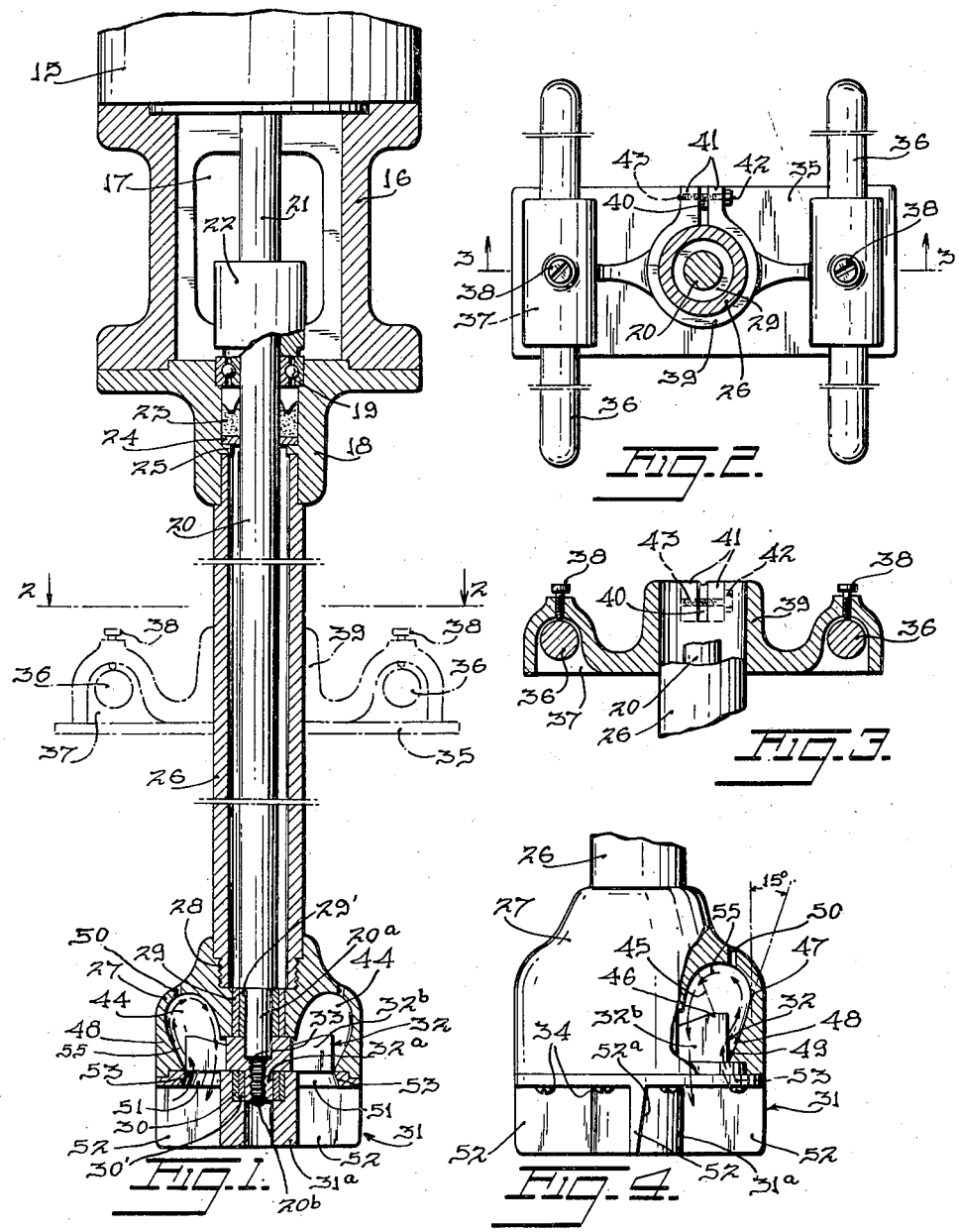
INVENTOR.
FREDERICK SEBURGER
BY
*[signature]*
ATTORNEY Oct. 18, 1949.   F. SEBURGER   2,485,216
MIXER Filed Jan. 17, 1948   2 Sheets-Sheet 2

INVENTOR.
FREDERICK SEBURGER
BY
ATTORNEY

Patented Oct. 18, 1949

2,485,216

UNITED STATES PATENT OFFICE 2,485,216

MIXER

Frederick Seburger, Ozone Park, N. Y.

Application January 17, 1948, Serial No. 2,829

12 Claims. (Cl. 259—107)

This invention relates to combination mixer and emulsifying devices, especially to a type adapted for suspension into vessels, and to the method of mixing and emulsifying matter.

While mixers and emulsifiers are well-known in the art, the present invention contemplates a novel arrangement of a combination mixer and emulsifier of the type indicated, wherein matter to be treated is subjected to a combination of successive processing actions between the time the matter enters and leaves the device. Within the device is a power driven rotary impeller, and such combination of successive actions may be defined as (1) a suction, cutting and scrubbing operation acting on the matter incidental to drawing the matter by the action of the impeller through a plurality of openings into a chamber having a specially shaped wall and consequent upon entry of the matter between the impeller blades; (2) a beating of the matter by the impeller blades; (3) a slapping and splashing of the matter against said wall, such splashing being by centrifugal force acting on the matter due to the whirling motion imparted to the latter by the impeller, said splashing followed by a curvilinear travel of the matter upwardly along said wall caused by the shape of a top wall portion, said travel first displacing the matter from and then bringing the matter back into the field of operation of the impeller; (4) consequently, a second cutting, scrubbing and beating of the matter by the impeller and by matter against matter; (5) a further continued cutting and scrubbing of the matter by discharge of the same through a plurality of openings, these openings being the same openings mentioned under (1) whereby the matter is further acted on by matter against matter action under pressure; (6) a second slapping and splashing of the matter issuing through said openings against surfaces provided for the purpose below said chamber; and (7) a forcefully effected discharge of the matter beyond said surfaces and in downward and outward directions, thereby to disturb the bottom settlement in the vessel.

While thus subjected to the aforesaid processing, the material treated is thoroughly mixed and emulsified before it is released. The device is designed to handle oil, creams, pastes, paints and similar matter required to become thoroughly homogenized, so that in its final form a colloidal suspension of solids within their liquid base is produced.

A device of the kind indicated must be of a simple construction, with all of its parts readily accessible for the purpose of cleaning and adjusting them, and must be sufficiently light in weight to afford portability and to permit its use wherever desired. One of its features must be its adjustability as to the depth of the vessel in which the device is to operate.

Having thus generally outlined the necessary requirements of such a device, the prime objects of the present invention are a novel method of mixing and emulsifying matter and the provision of a relatively simple, inexpensive and readily accessible combination mixer and emulsifier, for practicing that method, and wherein the chamber aforesaid is a substantially horizontally arranged annular chamber, the special shaping of its wall as aforesaid is a lateral shaping thereof whereby the aforesaid curvilinear travel of the matter is along lines substantially radial to the chamber, each of which lines first rises and then downwardly continues over substantially a semi-circular path, the impeller is mounted on a substantially vertical axis at substantially the center of said chamber and has a plurality of radial blades with their flats substantially vertical and shaped at their tops to lie below the highest archings of said paths, and the openings provided for the inflow of matter into said chamber and for the outflow of matter from said chamber are below the impeller blades.

A further object of this invention is to provide in conjunction with a combination mixer and emulsifying device of the type indicated, suitable means for driving the impeller, and to adjustably suspend the entire device from the top of a vessel wherein the device is to operate.

For further comprehension of this invention, and of the objects and advantages thereof, reference will be had to the following description and accompanying drawings, and to the appended claims in which the various novel features of the invention are more particularly set forth.

In the accompanying drawing, forming a material part of this disclosure:

Figure 1, throughout in axial section except for the motor fragmentarily illustrated, is a view which shows an embodiment of the apparatus of the invention now favored; this view showing in dot and dash lines a tank top and a part of the apparatus adjustable thereon for resting on the tank top thereby to submerge the mixing and emulsifying unit at a selected level in the tank.

Fig. 2 is a horizontal section, taken on the line 2—2 of Fig. 1, but on a reduced scale, and showing said adjustable part in top plan.

Fig. 3 is a partial vertical section, taken on the line 3—3 of Fig. 2.

Fig. 4 is an enlarged elevational view, partially broken away and partially in section, showing said mixing and emulsifying unit.

Figure 5:
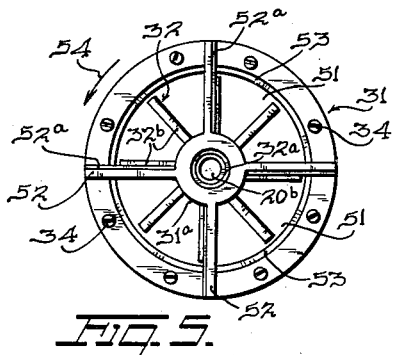
Fig. 5 is a bottom plan view of the parts as seen in Fig. 4.

Referring to the drawings more in detail and first to Fig. 1, the device is shown as carrying at its top a motor 15, suitably secured at its bottom to the upper end of a tubular casting 16 having a pair of opposite openings one of which is marked 17, the casting 16, at its bottom flange, being suitably secured to the top flange of a sleeve casting 18 within which is an annular-thrust ball bearing 19 through which passes a drive shaft 20 connected to the motor shaft 21 by a coupling 22 within the hollow interior of the casting 18.

Inside the sleeve casting 18 is a gland or seal 23 resting on a knock-out ring 24 seated on an internal annular flange 25. Below said flange the interior of the casting 18 has suitably tightly secured therein the upper end of a tube 26. This tube may be of any desired length, a satisfactory and practicable length therefor having been found to be three feet in a medium size mixer.

The mixing housing 27 is carried at the lower end of the tube 26, by the threaded engagement between these parts indicated at 28. The drive shaft 20, as it descends below the tube to enter the housing, is reduced in diameter at 20$^a$, and therebelow has a further reduced and externally threaded bottom extension 20$^b$. At 29 and 30 are indicated, respectively, a main bearing means 29—29' and a bottom bearing means 30—30' said main bearing means incorporating an outer bushing 29 and an inner bushing 29', and, in the upper part of the housing 27, being for the drive shaft 20, and said bottom bearing means incorporating an outer bushing 30 and an inner bushing 30', and, in the hub portion 31$^a$ of a bottom plate 31, being for the hub portion 32$^a$ of an impeller 32.

Referring to the bushings 29 and 29', this double bushing is for replacement of a worn bushing. In such double bushing, the impeller 32 is jammed against the inside bushing 29', which locks and secures both the bushings 29 and 29' and the impeller. The inside bushing 29' is of greater length, by .002", than the length of the outside bushing 29 and the length of the hub of the housing 27, so that there will be no end friction at all. Such an excess length for the inner bushing 30' over the length of the outer bushing 30' is also provided.

Below said bearing means 29—29', the portion 20$^a$ of the drive shaft 20 extends into the central bore of the impeller 32. The shaft portion 20$^a$ has its bottom end resting on an annular shoulder 33 formed in the bore of the impeller 32. Below the shoulder 33 the bore of the impeller 32 is internally threaded to match the thread on the reduced extension 20$^b$ of the drive shaft 20, for securing the impeller to the shaft 20.

The bottom plate 31 is fixed on the bottom of the housing 27, by screws 34 (Figs. 4 and 5), thereby to pocket the bottom bearing 30—30' between the bottom of the main portion of the hub 32$^a$ of the impeller 32 and the top of a hub 31$^a$ of the bottom plate 31.

Referring to Figs. 1–3, the tube 26 carries an attachment comprising a bridge plate casting 35, and a pair of hand rails 36, whereby the device may be supported from the top of a tank or other vessel containing the matter to be mixed or emulsified. The hand rails 36, each of which passes through aligned openings in the end walls of an open-bottom channel formation 37 across an end of the bridge plate, are held in position by screws 38.

At the center of the bridge plate 35 is a sleeve portion 39 for embracing the tube 26 with sufficient looseness, when a clamping means present is not drawn up tight, to permit placing the bridge plate at any desired point along the length of the tube 26 between the sleeve casting 18 and the housing 27. Said clamping means is provided by a slot 40 in the hub portion 39, a pair of outwardly projected lugs 41 one at each side of said slot, and a screw 42 passing through one of said lugs and threadedly engaging the other lug as indicated at 43.

Within the housing 27 is an annular mixing and emulsifying chamber 44 which all around the same is of the cross-section illustrated in Fig. 1. The chamber 44 has a lower inner cylindrical wall defined by the exterior of the top part of the hub 32$^a$ of the impeller 32. Above the hub portion 32$^a$, the chamber 44 is shown as laterally of semi-circular extension, with the radius of curvature 45 (Fig. 4) centered at 46; such curvature continuing to the point 47. The outer wall 48 of the chamber 44 is shown as formed according to a straight taper, such taper being, as indicated in Fig. 4, at about 15° angle to the vertical.

Figure 6:
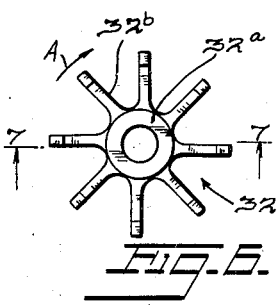
Fig. 6 is a top plan view of the impeller.
Figure 7:
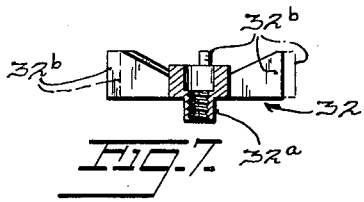
Fig. 7 is a section taken on the line 7—7 of Fig. 6.

The impeller 32 has eight radial blades 32$^b$ uniformly spaced around its hub portion 32$^a$, as shown in Figs. 6 and 7. From Fig. 6, it will be noted that the driving faces of said blades are flat and in the vertical planes containing the axis of the impeller, as indicated in the case of two of said blades in Fig. 6 with relation to the line 7—7; the direction of rotation of the impeller being pursuant to the arrow A shown in Fig. 6.

It will further be noted, from Figs. 1 and 4, that the impeller blades 32$^b$ are so shaped and arranged that they project into the chamber 44 in such manner that the blade tops are at or very slightly above the bottom level of the upwardly concave semi-circularly arched top wall of the chamber 44, and also in such manner that the outer end edges of the blades 32$^b$, which edges are vertical, are considerably spaced at their upper portions from the tapered side wall 48 of the chamber; while at the bottom of said blade end edges a slight clearance 49 is provided.

The clearance between the bottom of the blades 32$^b$ of the impeller 32 and the top of bottom plate 31 and of its depending fins 52, to be described in a moment, is very small, only about .002".

Two small orifices 50 are provided at the top of the casing 27, to allow escape of trapped air while immersing the mixing and emulsifying unit into the matter to be treated.

Referring now to the bottom plate 31, this is provided with four openings 51 (Figs. 1 and 5) alternating with four radially arranged depending splash fins 52. The outer arcuate walls of the openings 51 are downwardly outwardly tapered as at 53. Also, each fin 52, at its face toward which the blades of the impeller advance during rotation of the impeller, is downwardly tapered toward the bottom of the opposite face of such fin. Thus, with the arrangement such that the direction of impeller rotation is that indicated by the arrow 54 shown in Fig. 5, such tapered faces of the fins 52 are at 52ª.

Both inflow and outflow of the matter to be treated is through the openings 51. Here there is created matter against matter action under pressure, which may be termed a scrubbing treatment, and which so far as known is broadly new.

The main flow of the matter into, through and out of the chamber 44 in the housing 27 is indicated by the line of arrows 55 in Figs. 1 and 4. The full nature of the flow is shown in detail by the various arrows in Fig. 1; so that (1) There is what may be called a suction operation on the matter to draw it into the chamber 44 through the openings 51 at the outer end zones thereof; such action resulting from the pressure on the matter exterior to the casing 27 to cause such matter to enter into the chamber 44 to fill the same where depleted of its contained matter due to final discharge thereof through the openings 51 at the inner end zones of the openings 51.

Also, incidental to entrance of new matter into the chamber 44 through the openings 51 and consequent upon entry of the matter between the impeller blades 32ᵇ, there is a cutting and scrubbing of this matter, giving it an impetus to whirl around the chamber 44, and at the same time subjecting this matter to sufficiently powerful centrifugal force to drive the matter toward the wall 48 of the chamber.

(2) There is next a beating of the matter by the impeller blades 32ᵇ.

(3) Then there is a splashing of the matter against said wall, with the result that the matter travels upwardly toward the arched roof of the chamber 49, for flow over the same both longitudinally and laterally of the chamber, such flow along a rising and then along a falling path, with the falling part of the path intercepting the field of rotation of the inner portions of the impeller blades 32ᵇ.

(4) Consequently, next there is a second scrubbing, cutting and beating of the matter by the impeller 32, and by matter against matter, that is, by outgoing matter against incoming matter and vice versa, between the impeller blades 32ᵇ.

(5) There is next a discharge of the matter through the inner end portions of the openings 51, there here also occurring a scrubbing action of matter against matter under pressure.

(6) There is a second splashing of the matter, this being a splashing of the discharged matter against the tapered faces 52ª of the fins 52 of the bottom plate 31.

(7) Finally, there is a forcefully effected discharge of the matter beyond the faces 52ª of the fins 52 and in downward and outward directions, thereby to disturb the bottom settlement in the vessel containing the matter to be mixed or emulsified.

Thus, with only one moving part, the impeller 32, the matter is beaten twice, and splashed twice, and cut twice, incidental to entering and leaving the mixing and emulsifying unit, and in addition, the scrubbing action of matter against matter is continuously occurring at the openings 51 and between the impeller blades 32ᵇ, and, furthermore, there is a continuous forceful discharge of the matter through the openings 51 to direct the discharged matter in downward and outward directions thereby to disturb the bottom settlement in the vessel containing the matter to be mixed or emulsified. The high efficiency obtained in actual practice is remarkable.

The chamber 44, submerged to the desired depth below the surface level of the matter, is always free of air, as it cannot pull in air from the surface of the tank. At the same time, operation of the unit cannot cause excessive surface boil of the matter in the tank; whereas any paddle means or the like having its field of operation in the main body of matter in the tank, as is well known, may set up a degree of excessive surface disturbance of the matter, with a type of splashing adapted to establish air bubbles for incorporating these in the matter, which is objectionable in many cases. The method and apparatus of the present invention, while it sets up an agitation throughout the tank, does not set up such agitation to an extent to create air troubles.

Figure 8:
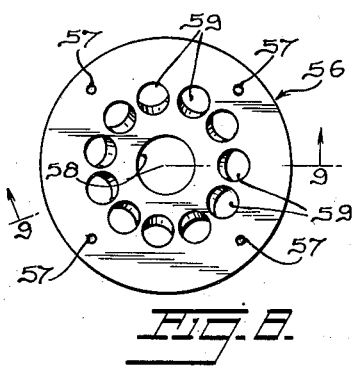
Fig. 8 is a bottom plan view of a modified form of bottom plate for said unit.
Figure 9:
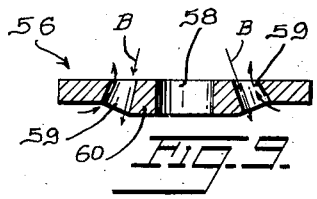
Fig. 9 is a section taken on the line 9—9 of Fig. 8.

Referring to Figs. 8 and 9, the modified bottom plate 56 here shown is proposed for special uses in substitution for the bottom plate 31; the apertures 57 corresponding to certain of the apertures through the rim of the plate 31 through which the screws 34 are sent, and the opening 58 corresponding to the central opening through the plate 31. In lieu of the openings 51, the plate 56 has a circularly arranged series of circular openings 59, each of said openings 59 inwardly upwardly inclined, and the bottom of the plate 56 has a depending truncated-cone-shaped enlargement 60 so shaped that the inner wall portions of the openings 59 are longer than the outer wall portions thereof.

Such longer wall portions, shown as of about the same taper as the faces 52ª of the fins 52, provide a second matter-splashing means having the same function as said faces 52ª of the fins 52. Inflow as well as outflow of the matter is through each of the openings 59, as indicated by the arrows B, in Fig. 9.

This type of bottom plate gives less production, but it has an increased cutting action which is of advantage in certain kinds of matter.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A combined mixer and emulsifier comprising a unit for operating below the surface level of the matter to be treated, said unit including a housing provided with an annular chamber having a top wall portion which cross-sectionally of the chamber is upwardly arched, an impeller in said chamber, and a power drive means for rotating said impeller, said impeller incorporating blades having a field of operation below the highest point of said top wall portion, said casing having a plurality of openings below said field of operation and through which openings said matter enters and also leaves said chamber, said chamber having an outer wall portion inclined upwardly and outwardly from the outer bottom corners of said blades to said top wall portion that the matter entering said openings for beating by said blades and so given a slapping and splashing action against said outer wall portion by centrifugal force is guided by said outer wall portion to rise up along the same thereby to flow pursuant to the arching of said top wall portion and so rise above said blades for subsequent downflow into that part of their field of operation near the inner ends of said blades for discharge from the inner end zones of said openings, said centrifugal force created by said blades causing a suction at the outer end zones of said openings drawing the matter into said chamber at the outer end zones of said openings.

2. A combined mixer and emulsifier comprising a unit for operating below the surface level of the matter to be treated, said unit including a housing provided with an annular chamber having a top wall portion which cross sectionally of the chamber is upwardly arched, an impeller in said chamber, a power drive means for rotating said impeller, said impeller incorporating blades having a field of operation below the highest point of said top wall portion, said casing having a plurality of openings below said field of operation and through which openings said matter enters and also leaves said chamber, said chamber having an outer wall portion inclined upwardly and outwardly from the outer bottom corners of said blades to said top wall portion that the matter entering said openings for beating by said blades and so given a slapping and splashing action against said outer wall portion by centrifugal force is guided by said outer wall portion to rise up along the same thereby to flow pursuant to the arching of said top wall portion and so rise above said blades for subsequent downflow into that part of their field of operation near the inner ends of said blades for discharge from the inner end zones of said openings, said centrifugal force created by said blades causing a suction at the outer end zones of said openings drawing the matter into said chamber at the outer end zones of said openings, and fixed elements below said openings presenting surfaces against which the matter discharged from the inner end zones of said openings splashes and is then forcefully directed in a downward and outward path thereby to stir up the matter at its bottom settlement zone.

3. A combined mixer and emulsifier comprising a unit for operating below the surface level of the matter to be treated, said unit including a housing provided with an annular chamber having a top wall portion which cross sectionally of the chamber is upwardly arched, an impeller in said chamber, a power drive means for rotating said impeller, said impeller incorporating blades having a field of operation below the highest point of said top wall portion, said casing having a plurality of openings below said field of operation and through which openings said matter enters and also leaves said chamber, said chamber having an outer wall portion inclined upwardly and outwardly from the outer bottom corners of said blades to said top wall portion that the matter entering said openings for beating by said blades and so given a slapping and splashing action against said outer wall portion by centrifugal force is guided by said outer wall portion to rise up along the same thereby to flow pursuant to the arching of said top wall portion and so rise above said blades for subsequent downflow into that part of their field of operation near the inner ends of said blades for discharge from the inner end zones of said openings, said centrifugal force created by said blades causing a suction at the outer end zones of said openings drawing the matter into said chamber at the outer end zones of said openings, and fixed elements below said openings presenting surfaces against which the matter discharged from the inner end zones of said openings splashes, said elements being radially arranged substantially vertical fins.

4. A combined mixer and emulsifier comprising a unit for operating below the surface level of the matter to be treated, said unit including a housing provided with an annular chamber having a top wall portion which cross sectionally of the chamber is upwardly arched, an impeller in said chamber, a power drive means for rotating said impeller, said impeller incorporating blades having a field of operation below the highest point of said top wall portion, said casing having a plurality of openings below said field of operation and through which openings said matter enters and also leaves said chamber, said chamber having an outer wall portion inclined upwardly and outwardly from the outer bottom corners of said blades to said top wall portion that the matter entering said openings for beating by said blades and so given a slapping and splashing action against said outer wall portion by centrifugal force is guided by said outer wall portion to rise up along the same thereby to flow pursuant to the arching of said top wall portion and so rise above said blades for subsequent downflow into that part of their field of operation near the inner ends of said blades for discharge from the inner end zones of said openings, said centrifugal force created by said blades causing a suction at the outer end zones of said openings drawing the matter into said chamber at the outer end zones of said openings, and fixed elements below said openings presenting surfaces against which the matter discharged from the inner end zones of said openings splashes, said elements being radially arranged substantially vertical fins, each of said fins having its face toward which said impeller blades advance during rotation of said impeller tapered downward and toward the opposite face of said fin.

5. A combined mixer and emulsifier comprising a unit for operating below the surface level of the matter to be treated, said unit including a housing provided with an annular chamber having a top wall portion which cross sectionally of the chamber is upwardly arched, an impeller in said chamber, and a power drive means for rotating said impeller, said impeller incorporating blades having a field of operation below the highest point of said top wall portion, said casing having a plurality of openings below said field of operation and through which openings said matter enters and also leaves said chamber, said chamber having an outer wall portion inclined upwardly and outwardly from the outer bottom corners of said blades to said top wall portion that the matter entering said openings for beating by said blades and so given a slapping and splashing action against said outer wall portion by centrifugal force is guided by said outer wall portion to rise up along the same thereby to flow pursuant to the arching of said top wall portion and so rise above said blades for subsequent downflow into that part of their field of operation near the inner ends of said blades for discharge from the inner end zones of said openings, said centrifugal force created by said blades causing a suction at the outer end zones of said openings drawing the matter into said chamber at the outer end zones of said openings, said openings being upwardly and inwardly inclined.

6. A combined mixer and emulsifier comprising a unit for operating below the surface level of the matter to be treated, said unit including a housing provided with an annular chamber having a top wall portion which cross sectionally of the chamber is upwardly arched, an impeller in said chamber, and a power drive means for rotating said impeller, said impeller incorporating blades having a field of operation below the highest point of said top wall portion, said casing having a plurality of openings below said field of operation and through which openings said matter enters and also leaves said chamber, said chamber having an outer wall portion inclined upwardly and outwardly from the outer bottom corners of said blades to said top wall portion that the matter entering said openings for beating by said blades and so given a slapping and splashing action against said outer wall portion by centrifugal force is guided by said outer wall portion to rise up along the same thereby to flow pursuant to the arching of said top wall portion and so rise above said blades for subsequent downflow into that part of their field of operation near the inner ends of said blades for discharge from the inner end zones of said openings, said centrifugal force created by said blades causing a suction at the outer end zones of said openings drawing the matter into said chamber at the outer end zones of said openings, said openings being upwardly and inwardly inclined and so formed that their inner wall portions are longer than their outer wall portions and are shaped and arranged to provide splash surfaces for the matter being discharged through said openings.

7. A combined mixer and emulsifier comprising a unit for operating below the surface level of the matter to be treated, said unit including a housing provided with an annular chamber having a top wall portion which cross sectionally of the chamber is upwardly arched, an impeller in said chamber, a power drive means for rotating said impeller, said impeller incorporating a plurality of blades having a field of operation below the highest point of said top wall portion, said casing having a plurality of openings below said field of operation and through which openings said matter enters and also leaves said chamber, said chamber having an outer wall portion inclined upwardly and outwardly from the outer bottom corners of said blades to said top wall portion that the matter entering said openings for beating by said blades and so given a slapping and splashing action against said outer wall portion by centrifugal force is guided by said outer wall portion to rise up along the same thereby to flow pursuant to the arching of said top wall portion and so rise above said blades for subsequent downflow into that part of their field of operation near the inner ends of said blades for discharge from the inner end zones of said openings, said centrifugal force created by said blades causing a suction at the outer end zones of said openings drawing the matter into said chamber at the outer end zones of said openings, and fixed elements below said openings presenting surfaces against which the matter discharged from the inner end zones of said openings splashes, said elements being radially arranged substantially vertical fins, there being a less number of said fins than the number of said impeller blades.

8. A combined mixer and emulsifier comprising a unit for operating below the surface level of the matter to be treated, said unit including a housing provided with an annular chamber having a top wall portion which cross sectionally of the chamber is upwardly arched, an impeller in said chamber, and a power drive means for rotating said impeller, said impeller incorporating blades having a field of operation below the highest point of said top wall portion, said casing having a plurality of openings below said field of operation and through which openings said matter enters and also leaves said chamber, said chamber having an outer wall portion inclined upwardly and outwardly from the outer bottom corners of said blades to said top wall portion that the matter entering said openings for beating by said blades and so given a slapping and splashing action against said outer wall portion by centrifugal force is guided by said outer wall portion to rise up along the same thereby to flow pursuant to the arching of said top wall portion and so rise above said blades for subsequent downflow into that part of their field of operation near the inner ends of said blades for discharge from the inner end zones of said openings, said centrifugal force created by said blades causing a suction at the outer end zones of said openings drawing the matter into said chamber at the outer end zones of said openings, said housing being provided with orifices at the top thereof leading from said chamber for the discharge of air therefrom when said unit is immersed into the matter.

9. A combined mixer and emulsifier comprising a unit for operating below the surface level of the matter to be treated, said unit including a housing provided with an annular chamber having a top wall portion which cross sectionally of the chamber is upwardly arched, an impeller in said chamber, and a power drive means for rotating said impeller, said impeller incorporating blades having a field of operation below the highest point of said top wall portion and said casing having a plurality of openings below said field of operation and through which openings said matter enters and also leaves said chamber, said chamber having an outer wall portion so shaped relative to said top wall portion that the matter entering said openings for beating by said blades and so given a slapping and splashing action against said outer wall portion by centrifugal force is guided by said outer wall portion to rise up along the same thereby to flow pursuant to the arching of said top wall portion and so rise above said blades for subsequent downflow into that part of their field of operation near the inner ends of said blades for discharge from the inner end zones of said openings, said outer wall portion in any axial section through said chamber defining a substantially straight upwardly and outwardly inclined line, each of said openings having a wall portion downwardly inclined from a point below said outer wall portion of said chamber.

10. A combined mixer and emulsifier comprising a unit for operating below the surface level of the matter to be treated, said unit including a housing provided with an annular chamber having a top wall portion which cross sectionally of the chamber is upwardly arched, an impeller in said chamber, and a power drive means for rotating said impeller, said impeller incorporating blades having a field of operation below the highest point of said top wall portion and said casing having a plurality of openings below said field of operation and through which openings said matter enters and also leaves said chamber, said chamber having an outer wall portion so shaped relative to said top wall portion that the matter entering said openings for beating by said blades and so given a slapping and splashing action against said outer wall portion by centrifugal force is guided by said outer wall portion to rise up along the same thereby to flow pursuant to the arching of said top wall portion and so rise above said blades for subsequent downflow into that part of their field of operation near the inner ends of said blades for discharge from the inner end zones of said openings, said outer wall portion in any axial section through said chamber defining a substantially straight upwardly and outwardly inclined line, each of said openings having a wall portion downwardly and outwardly inclined from a point below said outer wall portion of said chamber, and said top wall portion in any axial section through the chamber defining a substantially semi-circular line with its concavity lowermost.

11. A combined mixer and emulsifier comprising a unit for operating below the surface level of the matter to be treated, said unit including a housing provided with an annular chamber having a top wall portion which cross sectionally of the chamber is upwardly arched, an impeller in said chamber, and a power drive means for rotating said impeller, said impeller incorporating blades having a field of operation below the highest point of said top wall portion said casing having a plurality of openings below said field of operation and through which openings said matter enters and also leaves said chamber, said chamber having an outer wall portion inclined upwardly and outwardly from the outer bottom corners of said blades to said top wall portion that the matter entering said openings for beating by said blades and so given a slapping and splashing action against said outer wall portion by centrifugal force is guided by said outer wall portion to rise up along the same thereby to flow pursuant to the arching of said top wall portion and so rise above said blades for subsequent downflow into that part of their field of operation near the inner ends of said blades for discharge from the inner end zones of said openings, said centrifugal force created by said blades causing a suction at the outer end zones of said openings drawing the matter into said chamber at the outer end zones of said openings said power drive means including a vertical shaft journalled in the upper portion of said housing and to which said impeller is secured, a motor support adjacent the upper end of said shaft, a motor on said support, a fixed connecting structure between said motor support and said housing, and a packing gland between said structure and the motor.

12. A combined mixer and emulsifier comprising a unit for operating below the surface level of the matter to be treated, said unit including a housing provided with an annular chamber having a top wall portion which cross sectionally of the chamber is upwardly arched, an impeller in said chamber, and a power driven means for rotating said impeller, said impeller incorporating blades having a field of operation below the highest point of said top wall portion said casing having a plurality of openings below said field of operation and through which openings said matter enters and also leaves said chamber, said chamber having an outer wall portion inclined upwardly and outwardly from the outer bottom corners of said blades to said top wall portion that the matter entering said openings for beating by said blades and so given a slapping and splashing action against said outer wall portion by centrifugal force is guided by said outer wall portion to rise up along the same thereby to flow pursuant to the arching of said top wall portion and so rise above said blades for subsequent downflow into that part of their field of operation near the inner ends of said blades for discharge from the inner end zones of said openings said centrifugal force created by said blades causing a suction at the outer end zones of said openings drawing the matter into said chamber at the outer end zones of said openings, said power drive means including a vertical shaft journalled in the upper portion of said housing and to which said impeller is secured, a motor support adjacent the upper end of said shaft, a motor on said support, a fixed connecting structure between said motor support and said housing, a supporting member for the unit, said member on said connecting structure and adjustable therealong between said housing and said motor, and means for clamping said member to said structure in any adjusted position of said member on said structure.

FREDERICK SEBURGER.

REFERENCES CITED

The following references are of record in the file of this patent:

UNITED STATES PATENTS

| Number | Name | Date |
|---|---|---|
| 995,725 | Rothenberg | June 20, 1911 |
| 1,573,017 | Podszus | Feb. 16, 1926 |
| 2,078,065 | De Bethune | Apr. 20, 1937 |
| 2,163,150 | Meissner | June 20, 1939 |